United States Patent [19]
Anttila et al.

[11] Patent Number: 6,068,696
[45] Date of Patent: May 30, 2000

[54] FLEXURAL BOND STRENGTH/LOW AIR/ WORKABILITY ADDITIVE FOR MORTAR CEMENT

[75] Inventors: Arthur L. Anttila, Wilmington; Sung G. Chu; Thomas J. Podlas, both of Hockessin; Teng-Shau Young, Wilmington, all of Del.

[73] Assignee: Hercules Incorporated, Wilmington, Del.

[21] Appl. No.: 09/121,613

[22] Filed: Jul. 20, 1998

[51] Int. Cl.$^7$ ..................................... C04B 26/00
[52] U.S. Cl. .......................... 106/726; 106/738; 106/792; 106/823
[58] Field of Search ..................... 106/726, 738, 106/792, 823

[56] References Cited

U.S. PATENT DOCUMENTS

| | | |
|---|---|---|
| 2,934,932 | 5/1960 | Wagner . |
| 4,058,405 | 11/1977 | Snyder et al. . |
| 4,131,474 | 12/1978 | Uchikawa et al. ................. 106/38.35 |
| 4,135,940 | 1/1979 | Peltier . |
| 4,708,745 | 11/1987 | Schonhausen ........................ 427/427 |
| 5,372,642 | 12/1994 | Bartz et al. ............................ 106/730 |

FOREIGN PATENT DOCUMENTS

| | | |
|---|---|---|
| 401173 | 7/1996 | Austria . |
| 182976 | 4/1980 | Czechoslovakia . |
| 245155 | 8/1986 | Czechoslovakia . |
| 428431 | 5/1991 | European Pat. Off. . |
| 798274 | 10/1997 | European Pat. Off. . |
| 2264075 | 7/1974 | Germany . |
| 2703342 | 8/1978 | Germany . |
| 3339197 | 5/1984 | Germany . |
| 3433543 | 3/1986 | Germany . |
| 3437680 | 4/1986 | Germany . |
| 37450 | 12/1985 | Hungary . |
| 50-109916 | 8/1975 | Japan . |
| 59-137351 | 8/1984 | Japan . |
| 6603806 | 10/1966 | Netherlands . |
| 1522480 | 8/1978 | United Kingdom . |

*Primary Examiner*—Paul Marcantoni
*Attorney, Agent, or Firm*—David Edwards

[57] ABSTRACT

A mortar cement composition is composed of a cement or ground portland cement clinker, ground limestone and/or lime, sand, a sufficient amount of water to render the composition flowable, and at least one water-soluble polymer present in the amount having a lower limit of about 0.001 wt % and an upper limit of about 0.04 wt % based on total dry weight of the ingredients, with the proviso that the extent of adsorption of the polymer onto the cement is less than 50%, and wherein the resulting mortar has 8–16% air content and greater than 70 psi flexural bond strength. This mortar cement composition is for use in building structures in all seismic zones.

46 Claims, No Drawings

FLEXURAL BOND STRENGTH/LOW AIR/ WORKABILITY ADDITIVE FOR MORTAR CEMENT

This invention relates to a mortar cement composition with improved properties useful for producing masonry mortar for the installation of brick, block and stone masonry construction. More specifically, this invention relates to the use of a class of polymer additives in such composition to render improved flexural bond strength, low air entrainment, and improved workability that is approved for use in building structures in all seismic zones.

BACKGROUND

Hydraulic cement is any mixture of fine-ground lime, alumina, and silica that will set to a hard product by admixture of water, which combines chemically with the other ingredients to form a hydrate.

Prior to the present invention, there were two principal factory-produced hydraulic cement products used in masonry construction: traditional masonry cement and portland cement/lime mortar mixture. Currently, the U.S. market is divided between these two products. Both types of hydraulic cement products contain portland cement as a major ingredient.

Portland cement is a type of hydraulic cement in the form of a finely divided gray powder composed of limestone, alumina, silica, and iron oxide as tetracalcium aluminoferrate ($4CaO.Al_2O_3.Fe_2O_3$), tricalcium aluminate ($3CaO.Al_2O_3$), tricalcium silicate ($3CaO.SiO_2$), and dicalcium silicate ($2CaO.SiO_2$). Small amounts of magnesium, sodium, potassium, and sulfur are also present. Hardening does not require air, and will occur under water.

Masonry cement is a class of special cements that typically produce more workable and plastic mortars than portland cement/lime mixtures. Traditional masonry cement is typically not suitable for unreinforced load-bearing masonry construction, specifically in high activity seismic areas because of its reputed low flexural strength, and poor bonding ability. High air content (i.e., 18–20%) and the lack or low level of suitable strength enhancers and bonding agents are usually responsible for the inability to eliminate these deficiencies.

A conventional masonry cement based-masonry mortar is a mixture of a masonry cement, sand, functional additives and water. In general, such masonry mortar does not provide adequate flexural bond strength for use in unreinforced load-bearing masonry construction. To satisfy the need for flexural bond strength, two classes of mortars may be used. One such class of material is a blend of portland cement and lime.

The other recently introduced class of special cement is mortar cement. Mortar cements are proprietary formulations having a variety of compositions, all of them including ground portland cement clinker, ground limestone, and functional additives which may include lime. A mortar cement is required to meet a specification in minimum flexural bond strength, according to ASTM 1329.

Three types of mortar cements, i.e., M, N, and S, are currently specified for use in the masonry construction industry. These types of mortar cements are classified based on their strength properties. Generally, the strength is based on the amount of ground portland clinker, ground limestone, lime, air entraining agent, and other additives. The following Table A describes the physical requirements according to ASTM C-1329 for these mortar cement types.

TABLE A

| Mortar Cement Type | N | S | M |
|---|---|---|---|
| Physical Requirements | | | |
| Fineness, residue on a 45 μm (No. 325) sieve, max. % | 24 | 24 | 24 |
| Autoclave expansion, max. % | 1.0 | 1.0 | 1.0 |
| Time of setting, Gillmore method: | | | |
| Initial set, minutes, not less than | 120 | 90 | 90 |
| Final set, minutes, not more than | 1440 | 1440 | 1440 |
| Compressive strength (average of three cubes): The compressive strength of mortar cubes, composed of 1 part cement and 3 parts blended sand (half graded standard sand and half standard 20–30 sand) by volume, prepared and tested accordance with this specification, shall be equal to or higher than the values specified for the ages indicated below: | | | |
| 7 days, MPa (psi) | 3.4(500) | 9.0(1300) | 12.4(1800) |
| 28 days, MPa (psi) | 6.2(900) | 14.5(2100) | 20.0(2900) |
| Flexural bond strength | | | |
| 25 days, min. MPa (psi) | 0.5(70) | 0.7(100) | 0.8(115) |
| Air content of mortar | | | |
| Min. volume % | 8 | 8 | 8 |
| Max, volume % | 16 | 14 | 14 |
| Water retention value, min, %, of original flow | 70 | 70 | 70 |

Portland cement/lime mixtures are used today to produce high flexural bond strength mortars. However, such mortar made with portland cement and lime typically has poor workability. Hence, a need exists for producing a mortar cement that has good flexural bond strength and good workability at a relatively low air content as specified by ASTM C-1329.

Hence, the instant invention relates to a new class of polymer additives for use in mortar cements that meets this need of flexural bond strength and good workability at low air content. This class of polymer additives is characterized by their low adsorption onto portland cement which is a critical component of the mortar cement and is a newly defined class of materials for masonry construction. No prior art has been found that describes the use of the instant polymer additives for this specific application.

SUMMARY OF THE INVENTION

The present invention is directed to a mortar cement composition comprising
- a) ground portland cement clinker,
- b) ground limestone and/or lime,
- c) sand,
- d) a sufficient amount of water to render the composition flowable, and
- e) at least one water-soluble polymer present in the amount having a lower limit of about 0.001 wt % and an upper limit of about 0.04 wt % based on total dry weight of the ingredients, with the proviso that the extent of adsorption of the polymer onto the portland cement is less than 50%, and wherein the mortar cement has 8–16% air content and greater than 70 psi flexural bond strength as defined by ASTM C-1329–96.

The present invention also comprehends a method of improving the flexural bond strength of a mortar cement comprising adding to a mortar cement comprising cement, sand, water, and at least one water-soluble polymer in an amount having a lower limit of about 0.001 wt % and an upper limit of about 0.04 wt % based on total dry weight of the ingredients, wherein the mortar cement has 8–16% air content and greater than 70 psi flexural bond strength as defined by ASTM C 1329–96.

DETAILED DESCRIPTION OF THE INVENTION

It has been surprisingly discovered that certain additives, because of the low concentration needed, increase flexural bond strength (FBS) of mortar cement without deteriorating workability, and which meet other requirements specified in ASTM C1329. Also, it was surprisingly found that the polymers that produced flexural bond strength and workability, all have low levels of adsorption onto portland cement that is less than 50%, preferably less than 40%, and more preferably less than 30% based on the total solids content. The additive is a family of water-soluble polymers, which have good stability in high alkali conditions (i.e., pH greater than 10). They are cellulosic or synthetic water-soluble polymers, which are engineered to have high water retention capacity and low adsorption behavior onto portland cement. The amount of hydrophobe and molecular weight of polymers were engineered in such a way that only minimum amounts of polymer interact with minerals, and most of the polymer is available in the water phase. They do generate good workability with low air content and high flexural bond strength. They are compatible with other commercial cement admixtures for masonry mortar applications. As examples, alkylglycidyl modified hydroxyethylcellulose (marketed by Hercules Incorporated under the trademarks Nexton® M23W, Nexton®) M20W, and Nexton® 3082R), methylhydroxyethylcellulose (MHEC) (marketed by Hercules Incorporated under the trademark Culminal® MHEC 40,000P), and methylhydroxypropylcellulose (MHPC) (marketed by Hercules Incorporated under the trademark Culminal® MHPC 20000PFR or Dow's MHPC Methocel® 240S product) can be used for this mortar cement application. Other water-soluble polymers, such as modified polyvinyl alcohol and modified starches, also can be engineered to have such adsorption behavior onto portland cement. A practical way that this can be accomplished is by blending various polymers with different adsorption values for mortar cement applications.

The present invention applies to any mortar cement composition containing portland cement. The amount of cement present in the composition of the present invention has a lower limit of 20 weight percent based on the total dry ingredients, preferably 23 weight percent, more preferably 25 weight percent; the upper limit of the amount of the cement is 40 weight percent, preferably 35 wt. %, more preferably 30 wt. %.

Any type of sand that is commonly used in the building industry can be used in this invention. Typically, examples of the sand are ASTM 20/30 silica sands and job site sands. The amount of sand in the composition of the present invention has a lower limit of 55 wt %, preferably 60 wt. %, and more preferably 65 wt. %; the upper limit of the amount of sand present is 80 weight percent, preferably 78 wt. %, and more preferably 75 wt. %.

In the present invention, a small amount of water should be present to meet required flow properties. In other words, a sufficient amount of water must be present to render the mortar composition flowable. The amount of water in the mortar is determined by many factors such as the humidity, moisture levels in the other components and added mix water. By the term "flow" or "flowable" it is meant that the mortar contains enough water to produce a mortar of a usable consistency for the intended application.

According to the present invention, the water-soluble polymer is selected from the group consisting of hydroxypropylcellulose (HPC), hydroxyethylcellulose (HEC), methylcellulose (MC), hydroxypropylmethylcellulose (HPMC) methylhydroxyethylcellulose (MHEC) (marketed by Hercules Incorporated under the trademark Culminal® MHEC 40,000P), and hydrophobically modified hydroxyethylcellulose (HMHEC), so long as the selected polymer has a level of adsorption onto portland cement that is less than 50%.

HMHEC is a hydrophobically modified HEC, where the hydrophobe moiety is a straight or branched chain alkyl or aryl group having an upper limit of 20 carbons, preferably 8 carbon atoms, and more preferably 4 carbon atoms. The lower limit of the carbons in the hydrophobe for the HMHEC is 2 carbon atom for straight chain alkyl and 3 for branched chain alkyl. It should be understood that the backbone of the HMHEC may contain more than one type of hydrophobe. For example, an alkyl group having two carbons and an alkyl group having four carbons both may be present on the same polymer backbone. Specific examples of the HMHEC are ethylhydroxyethylcellulose, butylglycidyletherhydroxyethylcellulose, and laurylglycidyletherhydroxyethylcellulose.

The degree of hydrophobe molar substitution of the HMHEC has a lower limit of 0.005 and an upper limit of 0.2. The weight average molecular weight of the polymers of the present invention has a lower limit of about 50,000, preferably 70,000, and more preferably 100,000 and an upper limit of about 1,500,000. In addition, the polymer of the present invention has a solution viscosity of at least 100 cps at 4% polymer concentration as measured at 25° C. on a Brookfield viscometer at 30 rpm.

According to the present invention, the water-soluble polymer should be present in the composition with an upper limit of less than 0.049 weight percent, preferably 0.04 wt. %, more preferably 0.03 wt. %, and still more preferably 0.02 wt. % with the most preferred amount being 0.01 wt. %.

According to the present invention, functional additives optionally can be used in the composition. The manufacturer will determine the need and type of functional additive to be used depending on the intended end use and other conditions that are well known in this industry. Examples of these functional additives are air entraining agent, set retarder, fly ash, or grinding aids. The amounts of the functional additives are adjusted to provide good mortar properties and normally have an upper limit amount present in the composition of one weight percent. These functional additives are optional and cannot be used to replace the water-soluble polymers of the present invention.

The following examples are merely set forth to further illustrate the invention and are not to be considered as a limitation on the invention. All parts and percentages are by weight unless noted otherwise.

EXAMPLE 1

A series of three alkylglycidyl modified hydroxyethylcellulose polymers was mixed with portland cement and marble stone dust (a form of ground limestone) to produce a mortar cement. The portland cement/marble dust ratio was 70/30 based on weight. The polymer concentration was 0.007 wt % of the solid ingredients of the mortar. The typical cement mortar testing formulation which was used is set forth in the following Table 1.

TABLE 1

Mortar cement formulations

| Mortar ingredients | Exp. 1 Control Weight (g) | Exp. 2 Control Weight (g) | Exp. 3 Weight (g) | Exp. 4 Weight (g) | Exp. 5 Weight (g) |
|---|---|---|---|---|---|
| S type Masonry Cement* | 1190 | 0 | 0 | 0 | 0 |
| Cement (Portland cement/ marble dust, 70/30) | 0 | 1190 | 1190 | 1190 | 1190 |
| Sands** | 3600 | 3600 | 3600 | 3600 | 3600 |
| Nexton M 20W | 0 | 0 | 0.34 (0.007%) | 0 | 0 |
| Aqu D-3120-252$^a$ | 0 | 0 | 0 | 0.34 (0.007%) | 0 |
| Nexton 3082R | 0 | 0 | 0 | 0 | 0.34 (0.007%) |
| Water*** | 527 | 503 | 551 | 551 | 551 |
| Total weight (g) | 5317 | 5294 | 5341.34 | 5341.34 | 5341.34 |

*S type masonry cement was a commercial product from Keystone Cement Inc.
**Sand is the blend of Ottawa graded silica and 20/30 silica (1/1 ratio) according to ASTM C-778, obtained from Union Corp, Le Seur, Minnesota.
***Water content was adjusted based on mortar flow, of 110–130 measured by a flow table (ASTM1329).
a - This is an experimental HMHEC polymer with a 1% Brookfield viscosity of 800–1200cps at 25° C.

The mortar was prepared with a laboratory Hobart mixer. Water content was adjusted to have flow of 125±5 for flexural bond measurement. Several couplet specimens were prepared with National Concrete Masonry Association (NCMA), Herndon, Va., standard cement bricks to measure their flexural bond strength (FBS). Couplets were cured 28 days before measuring FBS with a bond wrench (according to Uniform Building Code (UBC) 21-20). Water retention and air content were measured according to ASTM C91–96. Workability of mortars was graded as poor, adequate, good and excellent. Adsorption of water-soluble polymer onto portland cement was measured from the supernatant, which was obtained from the mixture of portland cement, polymer and water (0.05 wt % polymer) after centrifugation. Type 1 portland cement, polymer and water (400 g/0.2 g/1 50 g) were mixed for 10 minutes in a beaker with a mechanical stirrer. The cement slurry solution was transferred to centrifugation tube and centrifuged for 1 hour at 1300 rpm. The supernatant was separated from the cement slurry and further centrifuged for 30 minutes. The supernatant was filtered with a 25 mm syringe filter (from Chromacol, Trumbul, Conn.) before being analyzed for polymer concentration. The polymer concentration in the supernatant was measured using a size exclusion chromatograph (SEC) with a reflective index detector (ERMA 7512, ERMA CR Inc., Tokyo, Japan) at 30° C. The polymer concentration of the supernatant was determined from the height of the isolated polymer peak on the SEC chromatogram. SEC is assembled with three Synchropak HPLA columns (two GPC 300–250×4.6 mm and one GPC 100–250×4.6 mm). As a mobile phase, 70% methanol solution with 0.5 molar lithium nitrate was used. The columns of mortar properties and polymer adsorption data are summarized below in Table 2.

TABLE 2

Mortar properties and polymer adsorption data

| Mortar properties | Exp. 1 Control | Exp. 2 Control | Exp. 3 | Exp. 4 | Exp. 5 |
|---|---|---|---|---|---|
| Flexural Bond strength (psi) | 70 | 70 | 138 | 116 | 157 |
| Air Content (%) | 22 | 10 | 9.5 | 9.0 | 7.3 |
| Water Retention (%) | 63 | 70 | 84 | 81 | 88 |
| Workability | Poor | Poor | Excellent | Excellent | Good |
| Polymer Adsorption to Portland Cement (%) | — | — | 0 | 6 | 17 |

EXAMPLE 2

The mortar was prepared with blank cement made with 62% portland cement clinker, 34% limestone, and 4% gypsum. It was prepared at Construction Technology Laboratories (CTL), Skokie, Illinois, with a pilot ball mill ground to a fineness of 600 m$^2$/kg blaine specific surface. Experimental mortar formulations were prepared with Ottawa sand at a flow of 125. The mortar properties of polymer modified samples Culminal® 20000 PFR MHPC, Nexton® M20W HMHEC, Culminal®4000 PFR MHPC and Natrosol® 250HR HEC are shown in the following Table 3.

The mortar data in exp. 9 in Table 3 are obtained from the blend of two polymers (Nexton® M20W HMHEC and Culminal® 3000P MC; 65 wt %/35 wt %). The polymer blend was mixed with cement and sand as per Example 1.

TABLE 3

Mortar properties and polymer adsorption data

| Mortar properties | Exp. 6 | Exp. 7 | Exp. 8 | Exp. 9 | Exp. 10 |
|---|---|---|---|---|---|
| Polymer additive | Culminal MHPC 20000 PFR | Nexton M20W | Culminal MHPC 4000 PFR | Nexton M20W: 65 parts Culminal MC 3000 P:35 parts | Natrosol 250HR |
| Polymer concen- | 0.007% | 0.0125% | 0.0125% | 0.0125% | 0.024% |

TABLE 3-continued

Mortar properties and polymer adsorption data

| Mortar properties | Exp. 6 | Exp. 7 | Exp. 8 | Exp. 9 | Exp. 10 |
|---|---|---|---|---|---|
| tration, wt % | | | | | |
| Flexural Bond strength (psi) | 144 | 130 | 72 | 114 | 103 |
| Air Content (%) | 7.6 | 13 | 19 | 11.6 | 8.7 |
| Water Retention (%) | 83.5 | 84 | 78 | 80 | 76 |
| Workability | Good | Excellent | Good | Excellent | Good |
| Polymer Adsorption* to Portland Cement (%) | 24 | 0 | 22 | 12 | 23 |

*The adsorption property of polymers onto portland cement in water was measured by a size exclusion chromatograph (SEC), the same as in Example 1.

COMPARATIVE EXAMPLE A

The mortars were prepared with hydroxypropylguar and carboxymethyl cellulose (CMC) and synthetic water-soluble polymers such as alkali soluble polyacrylate (Alcogum® L-35) and modified polyacrylate (Acrysol® TT-935). Alcogum® L35 is a product of Alco Chemical Corporation. Acrysol® TT-935 is a product of Rohm and Haas. The mortar formulations were the same as in experiment 3 in Example 1, except the Nexton® polymer was replaced by hydroxypropylguar (HPG), carboxymethylcellulose (CMC) and synthetic water-soluble polymers. The polymer concentrations were also the same as in experiment 3 (0.007% based on solids). The mortar properties are shown in Table 4.

The mortars with these polymers have very poor workability and low water retention (<50%) since most of the polymers were adsorbed onto the cement. The samples had such poor workability and water retention such that they were unusable to prepare couplet samples acceptable for FBS tests.

TABLE 4

Mortar properties and polymer adsorption data

| Mortar properties | Exp. 11 | Exp. 12 | Exp. 13 | Exp. 14 |
|---|---|---|---|---|
| Polymer additive | Hydroxypropyl guar GXP 213B | Carboxymethyl cellulose CMC 7H4FK | Alcogum L35 | Acrysol TT-935 |
| Polymer concentration | 0.007% | 0.007% | 0.007% | 0.007% |
| Flexural Bond strength (psi) | * | * | * | * |
| Air Content (%) | 7.0 | 8.5 | ** | ** |
| Water Retention (%) | <50 | <50 | <45 | <45 |
| Workability | Poor | Poor | Poor | Poor |

TABLE 4-continued

Mortar properties and polymer adsorption data

| Mortar properties | Exp. 11 | Exp. 12 | Exp. 13 | Exp. 14 |
|---|---|---|---|---|
| Polymer Adsorption to Portland Cement (%) | 100 | 100 | 100 | 100 |

*Mortar workability is very poor and water retention is very low and its couplets can not be prepared for FBS measurements.
**Air content is not measured because mortar has poor quality and unacceptable water retention.

EXAMPLE 3

The mortar formulations were prepared with different amounts of hydrophobically modified hydroxyethylcellulose (Nexton M20W product). The composition of mortar was the same as in Table 1, except that the polymer concentrations were changed as indicated in Table 5.

This Example in Table 5 verifies the differences of this invention from U.S. Pat. No. 4,938,192. This invention requires much lower concentrations of water-soluble polymers (<0.05 wt % of the total solid) in a building composition, specifically for a mortar cement application.

TABLE 5

Physical properties of mortars with different amounts of Nexton AD202

| Mortar properties | Exp. 15 | Exp. 16 | Exp. 17 |
|---|---|---|---|
| Polymer additive | Nexton M20W | Nexton M20W | Nexton M20W |
| Polymer concentration (WT % based on solid) | 0.005 Lower Boundary | 0.0125 Optimum concentration | 0.05 Upper boundary* |
| Flexural Bond strength (psi) | 126 | 191 | ** |
| Air content (%) | 7.7 | 10.5 | 20.2 |
| Water retention, % | 78 | 89 | — |
| Workability | Good | Excellent | Poor/sticky |

*The polymer concentration was disclosed in building composition described in Table 6 of USP4,939,192 by H. E. 'Sas. The upper boundary concentration in the present invention is significantly below the lower boundary concentration of USP 4,939,192.
**FBS is not measured because mortar has poor workability and sticky.

While the invention has been described with respect to specific embodiments, it should be understood that they are not intended to be limiting and that many variations and modifications are possible without departing from the scope and spirit of this invention.

What is claimed:
1. A mortar cement composition comprising
   a) ground portland cement clinker,
   b) ground limestone and/or lime,
   c) sand,
   d) a sufficient amount of water to render the composition flowable, and
   e) at least one water-soluble polymer present in the amount having a lower limit of about 0.001 wt % and an upper limit of about 0.04 wt % based on total dry weight of the ingredients, said water-soluble polymer being selected from group consisting of hydroxypropylcellulose (HPC), hydroxyethylcellulose (HEC), methylcellulose (MC), hydroxypropylmethylcellulose (HPMC), methylhydroxyethylcellulose (MHEC), hydrophobically modified hydroxyethylcellulose (HMHEC), and mixtures thereof and having a molecular weight lower limit of about 50,000 with the proviso that the extent of adsorption of the polymer onto the portland cement is less than 50%, and wherein the mortar cement has 8–16% air content and greater than 70 psi flexural bond strength according to ASTM C-1329–96.

2. The composition of claim 1, wherein the cement is present in an amount having a lower limit of 20 wt % based on total dry weight of the ingredients.

3. The composition of claim 2, wherein the cement is present in an amount having an upper limit of 40 wt % based on total dry weight of the ingredients.

4. The composition of claim 1, wherein the sand is present in an amount having a lower limit of 55 wt % based on total dry weight of the ingredients.

5. The composition of claim 4, wherein the sand is present in an amount having an upper limit of 80 wt % based on total dry weight of the ingredients.

6. The composition of claim 1, wherein the water-soluble polymer has a lower limit of 0.003 wt % based on total dry weight of the ingredients.

7. The composition of claim 1, wherein the water-soluble polymer has a lower limit of 0.005 wt % based on total dry weight of the ingredients.

8. The composition of claim 1, wherein the water-soluble polymer has an upper limit of 0.03 wt % based on total dry weight of the ingredients.

9. The composition of claim 1, wherein the water-soluble polymer has an upper limit of 0.02 wt % based on total dry weight of the ingredients.

10. The composition of claim 1, wherein the water-soluble polymer is present in the amount of 0.01 wt % based on total dry weight of the ingredients.

11. The composition of claim 1, wherein the water-soluble polymer is HMHEC wherein the HMHEC contains at least one hydrophobe where the hydrophobe is an alkyl or aryl moiety having a lower limit of 2 carbons and an upper limit of 20 carbons.

12. The composition of claim 11, wherein the water-soluble polymer is a blend of the HMHEC and HPMC.

13. The composition of claim 11, wherein the upper limit is 10 carbons.

14. The composition of claim 13, wherein the upper limit is 6 carbons.

15. The composition of claim 1, wherein the solution viscosity is at least 100 cps at 4% polymer concentration as measured at 25° C. on a Brookfield viscometer at 30 rpm.

16. The composition of claim 14, wherein the degree of hydrophobe molar substitution has a lower limit of 0.005 and an upper limit of about 0.2.

17. The composition of claim 1, wherein the weight average molecular weight of the water-soluble polymer has a lower limit of about 50,000 and an upper limit of about 1,500,000.

18. The composition of claim 1, wherein the extent of adsorption of the polymer onto the portland cement is less than 40%.

19. The composition of claim 1, wherein the extent of adsorption of the polymer onto the portland cement is less than 30%.

20. The composition of claim 1, wherein the extent of adsorption of the polymer onto the portland cement is less than 20%.

21. The composition of claim 1, wherein at least one functional additive is present in the composition.

22. The composition of claim 21, wherein the at least one functional additive is present in an amount having an upper limit of 1 wt %.

23. The composition of claim 21, wherein the functional additive is selected from the group consisting of air entraining agent, set retarder, fly ash, and grinding aid.

24. A method of improving the flexural bond strength of a mortar cement comprising adding to a mortar cement comprising ground portland cement clinker, ground limestone and/or lime, sand, and water, at least one water-soluble polymer in the amount having a lower limit of about 0.001 wt % and an upper limit of about 0.04 wt % based on total dry weight of the ingredients, with the proviso that the extent of adsorption of the polymer onto the ground portland cement clinker is less than 50 wt %, and wherein the resulting mortar has 8–16% air content and greater than 70 psi flexural bond strength.

25. The method of claim 24, wherein the ground portland cement clinker is present in an amount having a lower limit of 20 wt %.

26. The method of claim 25, wherein the ground portland cement clinker is present in an amount having an upper limit of 40 wt % based on total dry weight of the ingredients.

27. The method of claim 24, wherein the sand is present in an amount having a lower limit of 55 wt % based on total dry weight of the ingredients.

28. The method of claim 27, wherein the sand is present in an amount having an upper limit of 80 wt % based on total dry weight of the ingredients.

29. The method of claim 24, wherein the water-soluble polymer has a lower limit of 0.003 wt % based on total dry weight of the ingredients.

30. The method of claim 24, wherein the water-soluble polymer has a lower limit of 0.005 wt % based on total dry weight of the ingredients.

31. The method of claim 24, wherein the water-soluble polymer has an upper limit of 0.03 wt % based on total dry weight of the ingredients.

32. The method of claim 24, wherein the water-soluble polymer has an upper limit of 0.02 wt % based on total dry weight of the ingredients.

33. The method of claim 24, wherein the water-soluble polymer is present in the amount of 0.01 wt % based on total dry weight of the ingredients.

34. The method of claim 24, wherein the water-soluble polymer is selected from the group consisting of hydroxypropylcellulose (HPC), hydroxyethylcellulose (HEC), methylcellulose (MC), methylhydroxypropylcellulose (MHPC), methylhydroxyethylcellulose (MHEC), hydrophobically modified hydroxyethylcellulose (HMHEC), and mixtures thereof.

35. The method of claim 34, wherein the water-soluble polymer is HMHEC wherein the hydrophobe is alkyl or aryl radical having a lower limit of 2 and an upper limit of 16 carbons.

36. The composition of claim 35, wherein the water-soluble polymer is a blend of the HMHEC and HPMC.

37. The method of claim 35, wherein the upper limit is 10 carbons.

38. The method of claim 35, wherein the upper limit is 6 carbons.

39. The method of claim 23, wherein the extent of adsorption of the polymer onto the ground portland cement Cin er is less than 40%.

40. The method of claim 37, wherein the extent of adsorption of the polymer onto the ground portland cement clinker is less than 30%.

41. The method of claim 38, wherein the extent of adsorption of the polymer onto the ground portland cement clinker is less than 20%.

42. The method of claim 24, wherein at least one functional additive is added to the mortar cement.

43. The method of claim 42, wherein the at least one functional additive is added in an amount having an upper limit of 1 wt %.

44. The method of claim 42, wherein the functional additive is selected from the group consisting of air entraining agent, set retarder, fly ash, and grinding aid.

45. The method of claim 35, wherein the HMHEC has a hydrophobe molar substitution lower limit of about 0.005 and an upper limit of about 0.2.

46. The method of claim 35, wherein the HMHEC has a molecular weight lower limit of about 50,000 and an upper limit of about 1,500,000.

* * * * *